US006843112B2

(12) United States Patent
Kure

(10) Patent No.: US 6,843,112 B2
(45) Date of Patent: Jan. 18, 2005

(54) THROTTLE OPENING DEGREE SENSOR

(75) Inventor: Takeo Kure, Kawasaki (JP)

(73) Assignee: Keihin Corporation, Tokyo (JP)

( * ) Notice: Subject to any disclaimer, the term of this patent is extended or adjusted under 35 U.S.C. 154(b) by 7 days.

(21) Appl. No.: 10/335,235

(22) Filed: Dec. 30, 2002

(65) Prior Publication Data

US 2003/0126916 A1 Jul. 10, 2003

(30) Foreign Application Priority Data

Jan. 7, 2002 (JP) ....................................... 2002-000442

(51) Int. Cl.7 ............................................... G01M 19/00

(52) U.S. Cl. ...................................................... 73/118.1

(58) Field of Search ............................ 73/118.1, 118.2; 123/339.24, 203, 399

(56) References Cited

U.S. PATENT DOCUMENTS 5,271,269 A * 12/1993 Rilling et al. .............. 73/118.1
5,365,168 A * 11/1994 Reichl .................... 324/207.16
5,375,333 A * 12/1994 Hecht et al. ................ 33/1 PT
5,571,960 A * 11/1996 Tateishi et al. ............ 73/118.2
6,029,510 A * 2/2000 Nakaie et al. ............. 73/118.1
6,691,678 B1 * 2/2004 Hashimoto et al. .......... 123/399

* cited by examiner

*Primary Examiner*—Edward Lefkowitz
*Assistant Examiner*—Octavia Davis
(74) *Attorney, Agent, or Firm*—ZITO tlp; Joseph J. Zito; Kendal M. Sheets

(57) ABSTRACT

A throttle opening degree sensor with an excellent mounting property to a small and middle size motor cycles, and with a less manufacturing cost of a throttle body including a throttle opening degree sensor, constituted such that a casing (5) has a single mounting flange portion (5B) extending in a direction (C) orthogonal to a longitudinal axial line (B—B) of a rotor (6) in one side surface (5A) side thereof, a single mounting hole (5C) is pierced to extend through the mounting flange portion (5B), a guide tube portion (5D) is formed to protrude coaxially with the longitudinal axial line (B—B) of the rotor (6) and a seal ring (7) is arranged in an outer periphery thereof in one side surface (5A) of the casing (5), one side surface (5A) of the casing (5) is arranged on the throttle body (1), the guide tube portion (5D) is inserted into and arranged within a tube portion guide hole (1C) formed coaxially with a throttle shaft (3) mounting the throttle valve (4), and the casing (5) is engaged by screwing with the throttle body (1) via the mounting hole (5C) of the mounting flange portion (5B).

2 Claims, 2 Drawing Sheets

THROTTLE OPENING DEGREE SENSOR

BACKGROUND OF THE INVENTION

1. Field of the Invention

The present invention relates to a throttle opening degree sensor mounted to a throttle body provided with throttle valve for opening and closing an intake passage, by which a potentiometer rotates in connection with a throttle valve, and an electric voltage signal is output in proportion to an opening degree of the throttle valve. The opening degree sensor mentioned above is used for detecting the opening degree of the throttle valve which controls an amount of air in a fuel injection apparatus or detecting an opening degree of the throttle valve of a carburetor for adjusting an amount and a concentration of an air-fuel mixture supplied to an engine.

2. Description of the Conventional Art

An example of a conventional throttle opening degree sensor is shown in FIGS. 3 and 4.

FIG. 3 is a side view in the state that the throttle opening degree sensor is mounted to a throttle body.

FIG. 4 is a vertical cross sectional view of a main portion in a line A—A in FIG. 3.

A description will be given with reference to these drawings.

Reference 10 denotes a throttle body in which an intake passage 11 is provided through. A throttle shaft 12 is transversely arranged within the intake passage 11, the throttle shaft is rotatably supported to a throttle shaft hole 10A of the throttle body 10, and the intake passage 11 is opened and closed by a butterfly type throttle valve 13 attached to the throttle shaft 12. The throttle shaft 12 crosses over the intake passage 11 and is rotatably supported to the throttle shaft hole 10A provided in the throttle body 10, and in the drawings, a left throttle shaft hole 10Aa is open onto a left end surface 10B of the throttle body 10 via a guide hole 10C having a larger diameter than the throttle shaft hole 10Aa. The throttle valve 13 in FIG. 3 is in the state of closing the intake passage 11, and the throttle valve 13 rotates in a clockwise direction in FIG. 3, to open the intake passage 11.

Reference symbol S denotes a throttle opening degree sensor, which is constituted of the following elements.

Reference numeral 14 denotes a casing, within which a rotor 15, a brush (not shown) fixed to the rotor 15, a resistance body (not shown) provided in a fixed member and slidably contacted by the brush and the like are received and arranged. A pair of one side mounting flange portion 14B and another side mounting flange portion 14C are integrally formed in the side of a flat right side surface 14A in the right side in FIG. 4 in the casing 14 so as to be directed toward one side C and another side D orthogonal to a longitudinal axial line B—B of the rotor 15, and mounting holes 14D are pieced through the respective mounting flange portions 14B and 14C.

Further, a guide tube portion 14E is formed in the right side surface 14A of the casing 14 so as to be coaxial with the longitudinal axial line B—B of the rotor 15 and as to slightly protrude to the right side E, and a clearance hole 14H is provided from a front end 14F of the guide tube portion 14E toward a rotor supporting hole 14G rotatably supporting the rotor 15. That is, the rotor supporting hole 14G is open to the front end 14F of the guide tube portion 14E via the clearance hole 14H.

Further, an annular seal ring groove 14J positioned outside the guide tube portion 14E is recessed in the right side surface 14A of the casing 14.

Further, the throttle opening degree sensor S is assembled with the throttle body 10 in the following manner.

The throttle opening degree sensor S is arranged on the left end surface 10B of the throttle body 10.

In accordance with the structure mentioned above, the right side surface 14A of the casing 14 is arranged in the left end surface 10B of the throttle body 10 so as to contact therewith, the mounting hole 14D of one side mounting flange portion 14B is arranged so as to face to one side screw hole 10G open to the left end surface 10B of the throttle body 10, the mounting hole 14D of another side mounting flange portion 14C is arranged so as to face to another side screw hole 10D open to the left end surface 10B, the guide tube portion 14E is inserted into and arranged within the guide hole 10C of the throttle body 10, and a flat portion 12A formed in a left end of the throttle shaft 12 is inserted into and arranged within a flat groove 15A provided in the rotor 15 and open toward the right side E.

Further, in the state mentioned above, screws 16 are inserted into the respective mounting holes 14D of one side mounting flange portion 14B and another side mounting flange portion 14C, and the screws 16 are screwed toward one side screw hole 10G and another side screw hole 10D, whereby the throttle opening degree sensor S is engaged by screwing with and fixed on the throttle body 10, and on the other hand, the throttle shaft 12 and the throttle opening degree sensor S are connected by the flat portion 12A and the flat groove 15A so as to synchronously rotate.

In accordance with the structure mentioned above, when the throttle valve 13 opens and closes the intake passage 11 on the basis of the rotation of the throttle shaft 12, the rotation of the throttle shaft 12 is transmitted to the rotor 15 from the flat portion 12A via the flat groove 15A, and the brush fixed to the rotor 15 slides on the resistance body provided in the fixed member in correspondence with the rotation mentioned above, whereby the throttle opening degree sensor S outputs an electric voltage signal corresponding to the rotation of the throttle shaft 12 toward the external.

In accordance with the conventional throttle opening degree sensor mentioned above, the throttle opening degree sensor S is assembled on the throttle body 10 via one side mounting flange portion 14B and another side mounting flange portion 14C, and since a pair of the mounting flange portions 14B and 14C are provided as mentioned above, it is impossible to make the throttle opening degree sensor S itself compact and in particular, a mounting property of the throttle body onto a motor cycle of a small or middle class piston displacement (for example, 90 cc, 120 cc, 250 cc or the like) is impaired, so that it is not preferable.

The reason for the necessity to provide with a pair of the mounting flange portions 14B and 14C as mentioned above is that there is not provided with a means for securely preventing the throttle opening degree sensor S from falling down at a time of arranging the throttle opening degree sensor S on the throttle body 10.

The guide tube portion 14E shown in FIG. 4 has a function for simply positioning sideward, and even in the case that the guide tube portion 14E is inserted into the guide hole 10C of the throttle body 10, it can not constitute a means for preventing the throttle opening degree sensor S from falling down off the longitudinal axial direction B—B.

Further, because a pair of the mounting flange portions 14B and 14C are provided, it is necessary to provide with two screw holes 10G and 10D in the throttle body 10, it is necessary to prepare two screws 16 and it is necessary to carry out a screwing operation at two times, resulting in an increase of number of parts and an increase of number of assembling man-hour, so that it is prevented a manufacturing cost of the throttle body from being reduced.

Further, in the throttle body 10, it is necessary to provide with bosses of supporting portions 10E and 10F facing to the mounting flange portions 14B and 14C, resulting in an increase of weight of the throttle body 10, and an increase of a thick portion which generates blow holes at a time of injection molding of the throttle body 10, so that it is not preferable. In particular, the supporting portions 10E and 10F facing to the mounting flange portions are formed near the left throttle shaft hole 10Aa, the generation of the blow holes causes an intrusion of air into the left throttle shaft hole 10Aa from the outside, so that it is not preferable.

Further, an airtightness between the left throttle shaft hole 10Aa and an atmosphere, an airtightness between the inside of the throttle opening sensor S and the atmosphere are achieved by a seal ring 17 such as an O-ring, a square ring or the like made of an annular elastic material (for example, a rubber) arranged within a seal ring groove 14J provided in the right side surface 14A of the casing 14, whereby it is necessary to form an annular seal boss 10H having a diameter G sufficiently larger than an outside groove diameter F of the seal ring groove 14J in an outer periphery of the left throttle shaft hole 10Aa, thereby, similarly to the above mentioned, increasing a weight of the throttle body 10 and generating the blow hole at a time of injection molding of the throttle body 10, so that it is not preferable.

SUMMARY OF THE INVENTION

A throttle opening degree sensor in accordance with the present invention is made by taking the problems mentioned above into consideration, and an object of the present invention is to provide a throttle opening degree sensor which has a excellent mounting property onto a throttle body for a small or middle size of motor cycle, to provide inexpensively a throttle body including a throttle opening degree sensor, with the reduction of a number of parts and an assembling man-hour at a time of assembling a throttle opening degree sensor on the throttle body, and to provide a throttle body including a throttle body opening sensor, in which a sealing boss of a throttle body for mounting of the throttle opening degree sensor is compact, a weight of the throttle body is reduced, and particularly generation of a blow hole in the sealing boss portion at a time of injection molding of the throttle body is prevented.

In order to achieve the object mentioned above, in accordance with a first aspect of the present invention, there is provided a throttle opening degree sensor sliding a brush fixed to a rotor rotating in connection with a displacement of a throttle valve on a resistance body and outputting an electric voltage signal in proportion to an opening degree of the throttle valve, characterized in that a casing receiving the rotor and the brush has a single mounting flange portion extending toward a direction orthogonal to a longitudinal axial line of the rotor, in one end surface side thereof, and a single mounting hole extending along the longitudinal axial line of the rotor is pierced in the mounting flange portion, a cylindrical guide tube portion coaxial with the longitudinal axial line of the rotor is formed to protrude sideward, and an annular seal ring is arranged in an outer periphery of the guide tube portion in one end surface of the casing, and one end surface of the casing is arranged on the throttle body, the guide tube portion is inserted into and arranged within a tube portion guide hole formed coaxially with a throttle shaft mounting the throttle valve, and the casing is engaged by screwing with the throttle body via the mounting hole of the mounting flange portion.

Further, in accordance with a second aspect of the present invention, in addition to the first aspect, the throttle opening degree sensor is characterized in that the rotor is slidingly arranged within the rotor supporting hole of the casing so as to be freely rotatable, and an annular second seal ring is arranged between an outer periphery of the rotor and an inner periphery of the rotor supporting hole.

In accordance with the first aspect of the present invention, since the guide tube portion is inserted into the tube portion guide hole in the throttle body and the seal ring is elastically arranged between the guide tube portion and the tube portion guide hole, whereby it is possible to prevent the throttle opening degree sensor from falling down with respect to the throttle body, it is possible to securely mount the throttle opening degree sensor to the throttle body by a single screw via the mounting hole provided in the single mounting flange portion.

Further, since the seal ring is arranged between the guide tube portion and the tube portion guide hole, it is possible to keep an airtightness between the throttle shaft hole and the atmosphere and an airtightness between the atmosphere and the inside of the throttle opening sensor, so that it is possible to reduce a diameter of the sealing boss formed in the outer periphery of the throttle shaft hole.

Further, in accordance with the second aspect of the present invention, since the second seal ring is arranged between the outer periphery of the rotor and the inner periphery of the rotor supporting hole, even when abrasion powders due to a slide motion are generated within the throttle shaft hole and the tube portion guide hole, the abrasion powders are not attached to the brush and the resistance body within the casing.

DESCRIPTION OF THE PREFERRED EMBODIMENT

A description will be given below of an embodiment of a throttle opening degree sensor in accordance with the present invention with reference to FIGS. 1 and 2.

Figure 1:
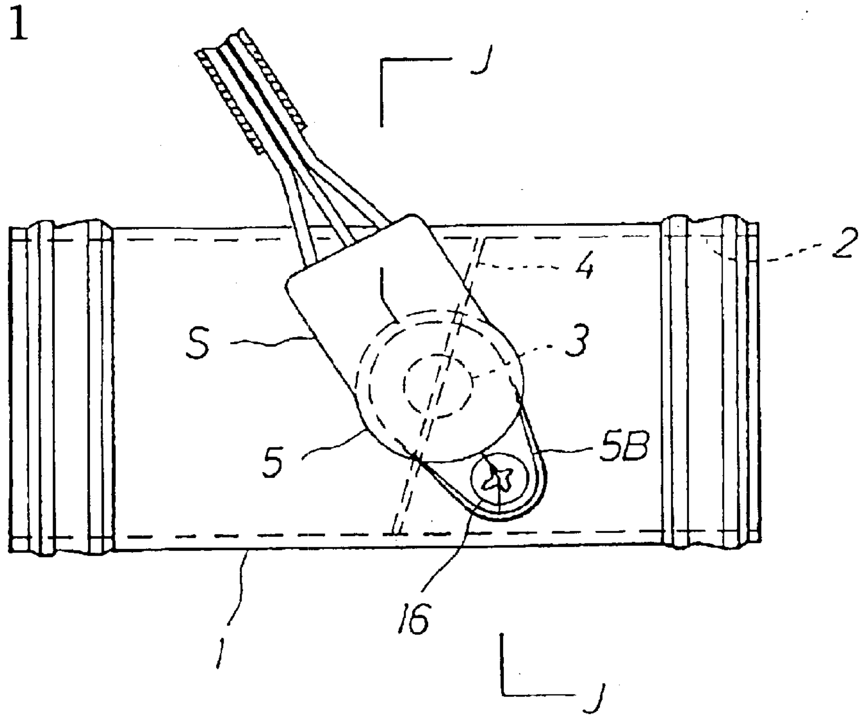
FIG. 1 is a side view in the state that a throttle opening degree sensor in accordance with the present invention is mounted to a throttle body.
Figure 2:
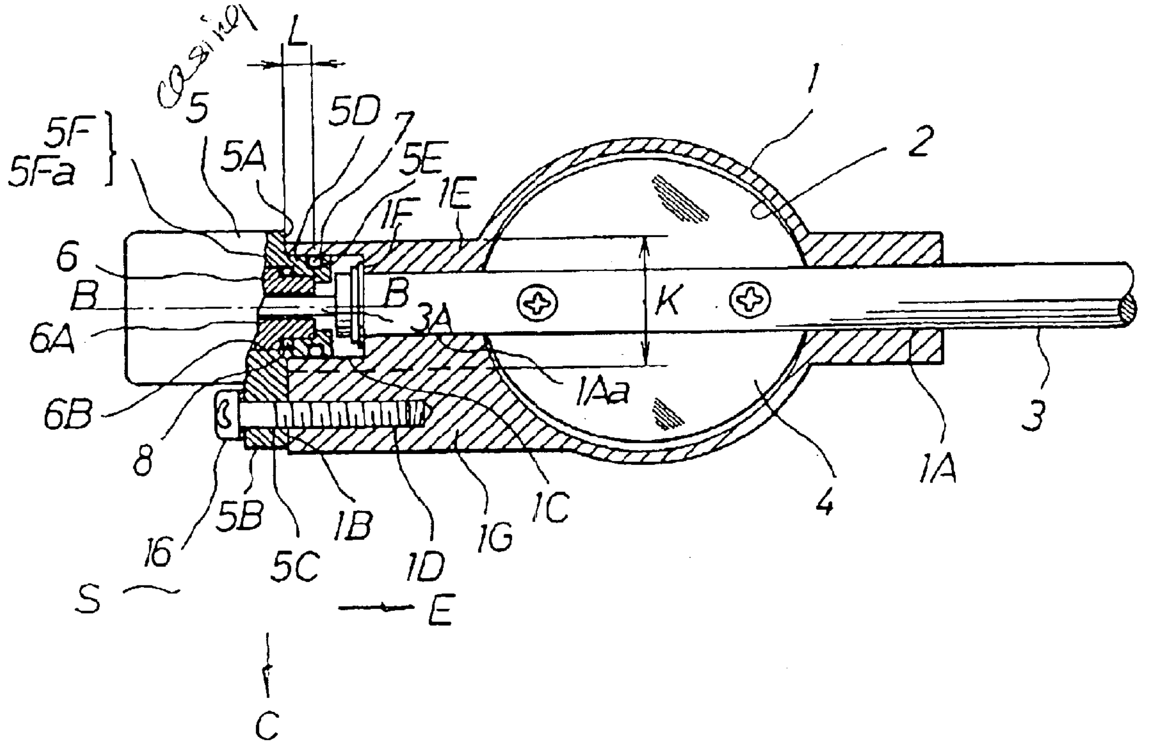
FIG. 2 is a vertical cross sectional view of a main portion along a line J—J in FIG. 1.
Figure 3:
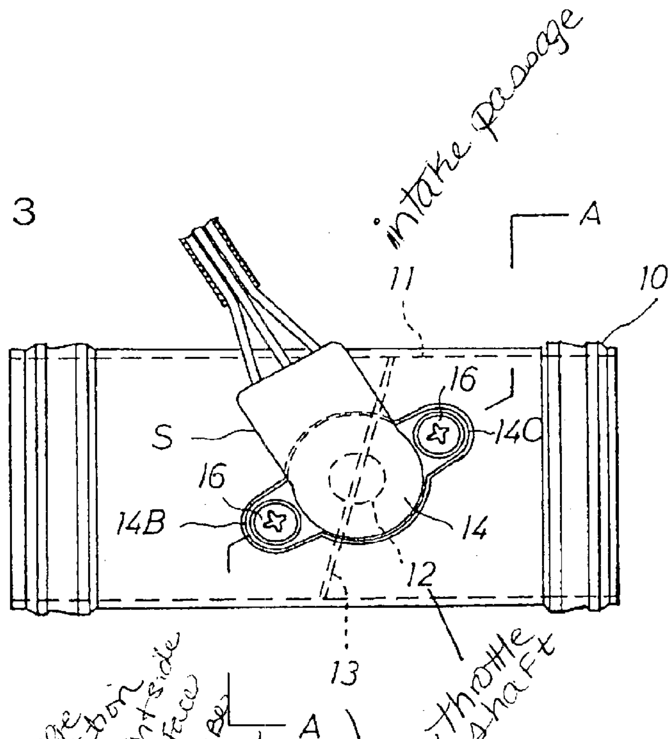
FIG. 3 is a side view in the state that a conventional throttle opening degree sensor is mounted to a throttle body.
Figure 4:
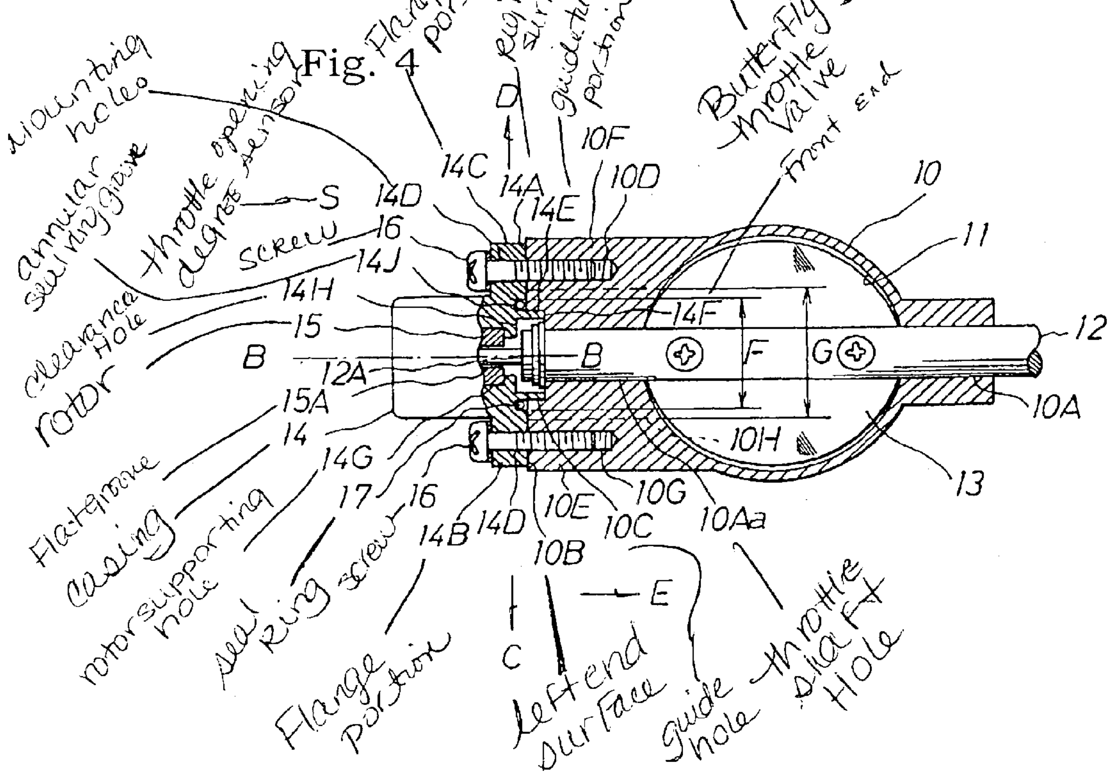
FIG. 4 is a cross sectional view of a main portion along a line A—A in FIG. 3.

FIG. 1 is a side view in the state that a throttle opening degree sensor is mounted to the throttle body, and FIG. 2 is a vertical cross sectional view of a main portion along a line J—J in FIG. 1.

Reference numeral 1 denotes a throttle body in which an intake passage 2 is provided to extend through. A throttle shaft 3 is transversely arranged within the intake passage 2, the throttle shaft is rotatably supported to a throttle shaft hole 1A of the throttle body 1, and the intake passage 2 is opened and closed by a butterfly type throttle valve 4 attached to the throttle shaft 3. Further, a left throttle shaft hole 1Aa in FIG. 2 is open on a left side surface 1B of the throttle body 1 through a tube portion guide hole 1C, and the diameter of the tube portion guide hole 1C is formed to be larger than that of the left throttle shaft hole 1Aa.

The throttle valve 4 in FIG. 1 is in the state of closing the intake passage 2, and when the throttle valve 4 rotates in a clockwise direction in FIG. 1, the intake passage 2 is opened.

Reference symbol S denotes a throttle opening degree sensor, which is constituted of the following elements.

Reference numeral 5 denotes a casing, within which a rotor 6, a brush (not shown) fixed to the rotor 6, a resistance body (not shown) provided in a fixed member and slidably contacted by the brush, and the like are received and arranged.

A mounting flange portion 5B is integrally formed in the side of a flat right side surface 5A in the right side in FIG. 2 in the casing 5 so as to be directed toward one side C orthogonal to a longitudinal axial line B—B of the rotor 6, and a mounting hole 5C extending along the longitudinal axial line B—B is pierced in the mounting flange portion 5B.

Further, a guide tube portion 5D is formed in the right side surface 5A of the casing 5 so as to be coaxial with the longitudinal axial line B—B of the rotor 6 and as to protrude to the right side E in FIG. 2.

Further, an annular ring groove 5G is provided in an outer periphery of the guide tube portion 5D, and a seal ring 7 constituted of an O-ring, a square ring, a lip seal or the like made of an elastic material (for example, a rubber material) is arranged in the ring groove 5G.

As the result of the ring groove 5E being provided, the length L in the longitudinal axial direction B—B of the guide tube portion 5D is formed to be longer than the length of the conventional guide tube portion 14E.

Further, a rotor supporting hole 5F is provided toward the inside of the casing 5 from the front end 5E of the guide tube portion 5D, and the rotor 6 is rotatably supported to the rotor supporting hole 5F. Further, the throttle opening degree sensor S is assembled with the throttle body 1 in the following manner.

The throttle opening degree sensor S is arranged on the left end surface 1B of the throttle body 1. In accordance with the structure mentioned above, the right side surface 5A of the casing 5 is brought into contact with and arranged in the left end surface 1B of the throttle body 1, the mounting hole 5C of the mounting flange portion 5B is arranged so as to face to the screw hole 1D open in the left end surface 1B of the throttle body 1, the guide tube portion 5D is inserted into and arranged within the tube portion guide hole 1C of the throttle body 1, and a flat portion 3A formed in the left end of the throttle shaft 3 is inserted into and arranged within a flat groove 6A provided in the rotor 6 and open toward the right side E.

Further, in the state mentioned above, a screw 16 is inserted into the mounting hole 5C of the mounting flange portion 5B and the screw 16 is screwed into the screw hole 1D, whereby the throttle opening degree sensor S is fixed by screwing onto the throttle body 1, and on the other hand, the throttle shaft 3 and the throttle opening degree sensor S is connected by the flat portion 3A and the flat groove 6A of the rotor 6 so as to synchronously rotate.

In accordance with the structure mentioned above, when the throttle valve 4 opens and closes the intake passage 2 on the basis of the rotation of the throttle shaft 3, the rotation of the throttle shaft 3 is transmitted to the rotor 6 via the flat groove 6A from the flat portion 3A, and the brush fixed to the rotor 6 slides on the resistance body provided in the fixed member in correspondence to the rotation, whereby the throttle opening degree sensor S outputs an electric voltage signal corresponding to the rotation of the throttle shaft 3 toward the external.

In accordance with the throttle opening degree sensor S structured in the manner mentioned above, since the length L of the guide tube portion 5D is formed to be longer than the conventional one by arranging the seal ring 7 in the guide tube portion 5D of the casing 5, it is possible to completely prevent the casing 5 itself from falling down at a time of inserting and arranging the guide tube portion 5D within the tube portion guide hole 1C (in other words, it is possible to increase an independence).

Accordingly, even at a time of engaging the casing 5 with the throttle body 1 by the single screw 16, it is possible to securely assemble the casing 5 on the throttle body 1 without falling down.

As mentioned above, since the throttle opening sensor S is mounted to the throttle body 1 by the single mounting flange portion 5B of the casing 5, the throttle opening degree sensor S can be made compact by reducing the size of the casing 5, whereby it is possible to make the throttle body provided with the throttle opening degree sensor S to be compact, and particularly it is possible to largely improve a mounting property onto small and middle size motor cycles. Further, since the mounting flange portion 5B is formed as a single one, the supporting portion 1G of the throttle body 1 corresponding thereto can be provided at one portion, whereby it is possible to achieve a weight reduction of the throttle body 1 and it is possible to reduce the generation of blow hole at a time of injection molding of the throttle body 1.

Further, since the casing 5 is engaged with the throttle body 1 by the single screw 16, only a single pair of the screw 16 and the screw hole 1D is required, and the screwing operation can be carried out at one time, so that it is possible to reduce the number of the parts and the assembling man-hour, and particularly, it is possible to reduce the manufacturing cost thereof.

Further, the airtightness between the throttle shaft hole 1A and the atmosphere and the airtightness between the inside of the casing 5 of the throttle opening degree sensor S and the atmosphere are achieved by the seal ring 7 arranged between the guide tube portion 5D and the tube portion guide hole 1C, whereby an outside diameter K of the boss portion 1E surrounding the left throttle shaft hole 1Aa may have a slightly larger diameter than the diameter of the tube portion guide hole 1C.

In accordance with the structure mentioned above, it is possible to prevent the blow hole in the boss portion 1E from being generated at a time of forming the throttle body 1 by means of casting, whereby it is possible to prevent the air from intruding from the atmosphere particularly to the throttle shaft hole 1Aa.

Further, in accordance with the throttle opening degree sensor S of the present invention, since a second seal ring 8 such as an O-ring, a ring seal or the like is arranged between an inner periphery 5Fa of a rotor supporting hole 5F formed in the casing 5 and an outer periphery 6B of the rotor 6, abrasion powders generated between the throttle shaft 3 and the left throttle shaft hole 1Aa at a time of sliding, or abrasion powders generated in an engagement step portion 1F of the tube portion guide hole 1C do not intrude to the inside of the casing 5 via gaps thereof, so that it is possible to stably output an accurate electric voltage signal for a long time.

In this case, since the flat groove 6A of the rotor 6 is a closed hole, the abrasion powders do not intrude within the casing from the inside of the flat groove 6A.

As mentioned above, in accordance with the throttle opening degree sensor of the present invention, the casing is provided with the single mounting flange portion in which the single mounting hole is pierced, the cylindrical guide tube portion protruding sideward from one end surface and formed coaxially with the longitudinal axial line of the rotor, and the annular seal ring arranged in the outer periphery of the guide tube portion, the mounting flange portion is arranged on the throttle body, the guide tube portion is inserted into and arranged within the tube portion guide hole of the throttle body, and the mounting flange portion is mounted to the throttle body by the single screw in the state mentioned above, whereby it is possible to make the throttle body including the throttle opening degree sensor compact, and particularly improve the mounting property to the small and middle size motor cycles. Further, since the mounting flange portion of the casing can be made single, it is possible to reduce the thickness of the supporting portion of the throttle body, whereby it is possible to prevent the blow hole from being generated at a time of injection molding of the throttle body.

Further, it is possible to mount the throttle opening degree sensor to the throttle body by the single screw, whereby the number of the parts for mounting and the screwing operation can be single and it is possible to reduce the manufacturing cost thereof.

Further, while the airtightness between the atmosphere and the throttle shaft hole and the airtightness between the atmosphere and the inside of the casing can be achieved by the seal ring arranged in the outer periphery of the guide tube portion, since the seal ring is arranged in the outer periphery of the guide tube portion, it is possible to reduce the diameter of the boss portion in the outer periphery of the throttle bearing, whereby it is possible to prevent the blow hole from being generated in the boss portion at a time of injection molding of the throttle body and it is possible to achieve the weight reduction of the throttle body.

Further, since the second seal ring is arranged between the rotor and the rotor supporting hole, it is possible to prevent the abrasion powder generated between the throttle shaft hole and the throttle shaft and the abrasion powder generated in the sliding portion within the tube portion guide hole from intruding within the casing, and it is possible to stably output a signal from the throttle opening degree sensor for a long time.

What is claimed is:

1. A throttle opening degree sensor sliding a brush fixed to a rotor rotating in connection with a displacement of a throttle valve on a resistance body and outputting an electric voltage signal in proportion to an opening degree of the throttle valve, characterized in that a casing (5) receiving the rotor (6) and the brush has a single mounting flange portion (5B) extending toward a direction (C) orthogonal to a longitudinal axial line (B—B) of the rotor (6) in a right side surface (5A) side thereof, a single mounting hole (5C) extending parallel to the longitudinal axial line (B—B) of the rotor (6) is pierced in the mounting flange portion, a cylindrical guide tube portion (5D) coaxial with the longitudinal axial line (B—B) of the rotor (6) is formed to protrude toward the right side (E) in the right side surface (5A) of the casing (5), an annular seal ring (7) is arranged in an outer periphery of the guide tube portion (5D), the right side surface (5A) of the casing is arranged on a left side surface (1B) of the throttle body (1), the guide tube portion (SF) is inserted into and arranged within a tube portion guide hole (1C) formed coaxially with a throttle shaft (3) mounting the throttle valve (4), and the casing (5) is engaged by screwing with the throttle body (1) via the mounting hole (5C) of the mounting flange portion (5B).

2. A throttle opening degree sensor as claimed in claim 1, characterized in that the rotor is slidingly arranged within the rotor supporting hole (5F) of the casing (5) so as to be freely rotatable, and an annular second seal ring (8) is arranged between an outer periphery (6B) of the rotor (6) and an inner periphery (5Fa) of the rotor supporting hole (5F).

* * * * *